ÜnitedStatesPatent [19]

Eichlseder et al.

[11] Patent Number: 4,477,242

[45] Date of Patent: Oct. 16, 1984

[54] BACKFLOW PREVENTER FOR AN INJECTION MOLDING MACHINE

[75] Inventors: Martin Eichlseder, Tettenweis; Erwin Bürkle, Benediktbeuern, both of Fed. Rep. of Germany

[73] Assignee: Krauss-Maffei Aktiengesellschaft, Munich, Fed. Rep. of Germany

[21] Appl. No.: 459,060

[22] Filed: Jan. 19, 1983

[30] Foreign Application Priority Data

Feb. 4, 1982 [DE] Fed. Rep. of Germany ....... 3203762

[51] Int. Cl.³ .............................. B29F 1/03; B29F 3/02
[52] U.S. Cl. .................................. 425/207; 264/328.1; 366/79; 425/562; 425/563; 425/564
[58] Field of Search ............... 425/207, 562, 563, 564, 425/559, 560, 561; 366/77, 79; 264/328.4, 328.12, 328.1

[56] References Cited

U.S. PATENT DOCUMENTS 3,319,299  5/1967  Kraly ..................................... 366/77
3,550,208 12/1970  Peters ................................... 425/563

FOREIGN PATENT DOCUMENTS 2617977 11/1977  Fed. Rep. of Germany ...... 425/207
2635144  2/1978  Fed. Rep. of Germany ...... 425/563
3009399  9/1981  Fed. Rep. of Germany ........ 366/79
52-14659  2/1977  Japan .................................... 425/563

OTHER PUBLICATIONS

"What Injection Molders Should Know About Reciprocating Screw-Tip Shutoffs," *Plastics Technology* Reprint.

*Primary Examiner*—Jay H. Woo
*Assistant Examiner*—Tinker R. McBrayer
*Attorney, Agent, or Firm*—Karl F. Ross; Herbert Dubno

[57] ABSTRACT

A backflow preventer at the end of an injection molding worm has a pressure ring which abuts directly upon the worm and serves a shank of the valvehead which also bottoms in a bore upon the worm so that force transmission to the worm is over its entire cross section. The shank is surrounded by a blocking ring which can shift in its axial stroke between a position in which it abuts the head and a position in which it abuts the pressure ring, the axial stroke being adjustable by shims forming the floor against which the shank abuts within the bore of the worm.

4 Claims, 2 Drawing Figures

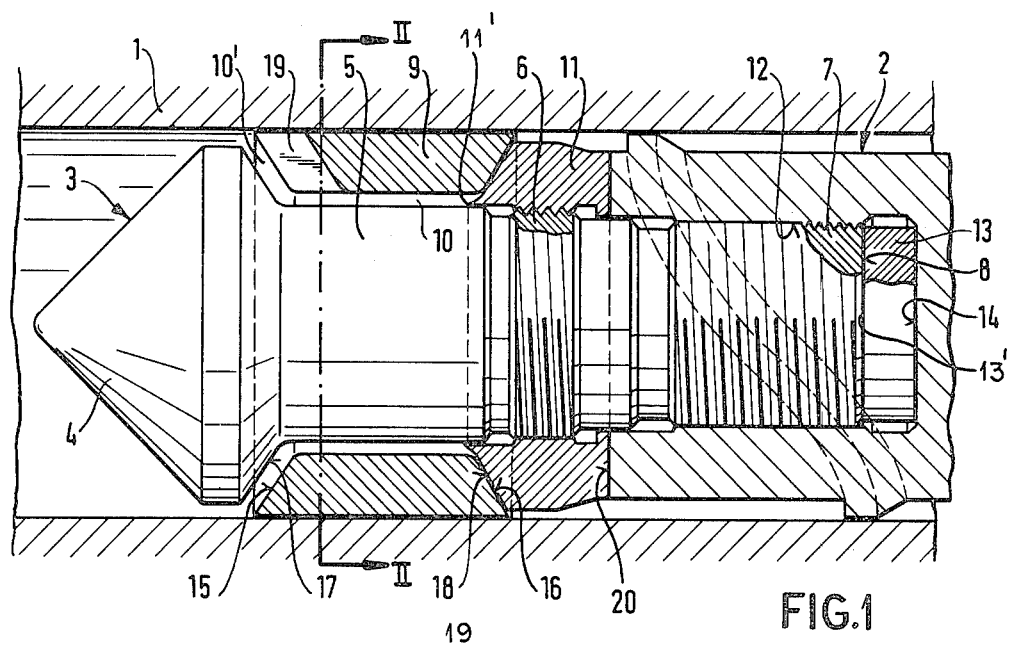
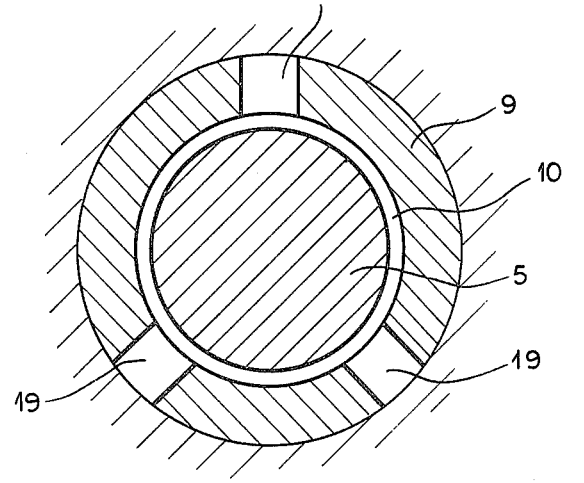

BACKFLOW PREVENTER FOR AN INJECTION MOLDING MACHINE

FIELD OF THE INVENTION

Our present invention relates to a backflow preventer or checkvalve of the type which can be mounted upon an injection molding screw or worm and is adapted to prevent backflow of the synthetic resin material from a location ahead of this worm upon the development of the injection molding pressure.

BACKGROUND OF THE INVENTION

It is known to provide a backflow preventer or checkvalve at the downstream end of a plastifier screw or worm in an injection molding machine to prevent backflow of the liquified or molten synthetic resin material as the injection molding pressure is built up ahead of the worm.

In general the injection molding machine can comprise the plastifier worm, and means for rotating this worm to homogenize, plastify and liquefy the thermoplastic synthetic resin material which is introduced into the cylinder in which the worm is rotated.

During the plastifying process, the material is advanced to a location ahead of the worm, usually past a backflow preventer or checkvalve, whereupon other means can be activated to axially displace the worm and, utilizing it as a sort of piston, to drive the material ahead of the worm into a mold (see U.S. Pat. No. 3,319,299).

As the injection molding pressure is built up ahead of the work, the checkvalve closes.

While various checkvalve or backflow preventer systems have been developed for this purpose, the present invention is only concerned with those which comprise a forwardly tapering or conical body secured to the downstream end of the worm, and a blocking ring disposed between this body and the worm and free to move axially between blocking and unblocking positions.

A pressure ring may be provided against the end of the worm to form a seat which is engaged by the blocking ring in the closed position of the valve.

In the aforementioned U.S. patent, the pressure ring is threaded onto a stem of the torpedo-shaped body and rests against a shoulder in the direction of flow of the synthetic resin material while the body is formed with channels effective to pass the synthetic resin material in the open position of the valve.

The forces generated by the pressure of the blocking ring against the pressure ring are all taken up directly by the stem of the torpedo body so that this stem is susceptible to damage. Of course damage to the stem can be avoided by increasing the diameter thereof, but any such increase in diameter will invariably result in a decrease in the annular space available to form the flow passage for the synthetic resin material.

An attempt is made to avoid this problem by applying the pressure ring of German open application No. 2,635,144 to the end of the worm, the shank of the conical body having a shoulder which bears upon the pressure ring. The shoulder helps to distribute force to the pressure ring and forces traversed from the blocking ring to the pressure ring and then to the end of the worm in the closed position of the valve.

This assembly, of course, improves the ability of a stem to withstand the forces generated, but it also represents a problem since here the pressure ring constitutes most of the force transmitting area, especially if it is used to establish the depth to which the stem is threaded into the end of the worm.

Reference may also be had to the backflow preventers described in German printed application No. 20 06 389 and in German open applications Nos. 30 09 399 and 28 36 165.

These checkvalves have either blocking rings movable relative to the worm or a head which is movable relative to the worm.

In all of the prior art systems thus far described, and even that of German open application No. 25 15 530 which has a movable head, it is understood that the checkvalves should be opened and closed rapidly and thus, that the surfaces exposed to the synthetic resin pressure which causes the opening and closing should be as large as possible.

Furthermore, it is advantageous to have large sealing surfaces and to be able to adjust the flow passage of the valve for different rheological properties of the synthetic resin material in the open position thereof.

The prior art valves have had various drawbacks, some of which have been dealt with previously but others of which have not yet been fully attached.

Obviously when only the stem of the conical body of the backflow preventer or valve cap of transferring force to the worm through a screw or the transfer of force is effective only through threads of a screw or by a pressure ring, the cross section of the worm over which large forces are transmitted must be comparatively small and further cannot be readily enlarged without reducing the surface areas exposed to the synthetic resin material and providing the rapid action which is required. In addition, the prior art devices are not readily, conveniently and accurately adjustable for the purpose of varying flow cross section in accordance with rheological properties.

OBJECTS OF THE INVENTION

It is the principal object of the present invention, therefore, to provide an improved backflow preventer of the class described, i.e. provided with a pressure ring, blocking ring and tapered head, whereby the disadvantages of the earlier systems are obviated.

Another object of the invention is to provide an injection molding assembly with an improved checkvalve and backflow preventer on the downstream end of the plastifying worm.

SUMMARY OF THE INVENTION

These objects are attained, in accordance with the invention, by providing the downstream end of the plastifying worm with an internally threaded longitudinally extending blind bore, forming the conical head with a stem which is threaded into this bore and bottomed on the floor thereof, providing a pressure ring which is threaded onto the shank and abutted against the end of the worm directly, and providing the blocking ring between a shoulder of the head and the pressure ring so that the passages are formed only in this blocking ring at the downstream end thereof and not in the head.

In other words, with this combination, whereby the shank of the head bottoms on the floor of the bore, the axial forces are transmitted to the end of the worm over the entire cross section thereof and nevertheless the large surface area can be provided on the blocking ring for rapid actuation thereof.

The most highly loaded parts of the assembly can be dimensioned to be stronger and thicker and there is less danger of damage to parts of the valve, so that the reliability of the operation is improved.

According to another feature of the invention, the floor is formed by a shim of selectable thickness, the thickness of this shim determining the axial stroke of the blocking ring, and hence the width of the passage traversed by the molten synthetic resin material, and hence the throughflow rate thereof.

The throughput of the synthetic resin material varies directly with the closing time and with the reproducibility of the opening and closing time.

According to another feature of the invention, the blocking ring is peripherally guided on the inner wall of the cylinder bore and the pressure ring is coupled to the shank by a thread and abuts over its entire area in the plane perpendicular to the axis of the valve, the worm too. No abutment is provided at the opposite end of this ring except for the beveled surface by which it engages the blocking ring.

It has been found to be advantageous moreover to have this beveled surface converge in the direction of movement of the flowable material and to overhang the large diameter cylindrical portion of the stem of the head so that, in effect a tapering lip closely rides on this surface.

As a consequence, the pressure ring only must bear forces applied thereto by the blocking ring and can transfer these forces directly to the end of the worm.

The pressure ring can be of a large cross section, therefore, and a major weak point of conventional systems is eliminated.

BRIEF DESCRIPTION OF THE DRAWING

The above and other objects, features and advantages of the present invention will become more readily apparent from the following description, reference being made to the accompanying drawing in which:

FIG. 1 is an axial cross sectional view through the backflow preventer of an injection molding machine; and FIG. 2 is a cross sectional view taken along the line II—II of FIG. 1.

SPECIFIC DESCRIPTION

In the drawing, we have shown an injection cylinder 1 of an injection molding machine which can be otherwise of the type described in U.S. Pat. No. 3,319,299, having a plastifying worm 2 for plastifying and displacing the synthetic resin material.

At the forward, downstream and left-hand end of the worm 2, a head 3 is affixed, this head forming part of a backflow preventer.

The downstream end of the head 3 has a forwardly converging conical body 4 which forms a shoulder 17 and inwardly thereof has smooth cylindrical large-diameter shafts 5 constituting part of a rearwardly extending shank.

Following the smooth shaft 5 is a threaded portion 6 of lesser diameter, and still further inward, there is another threaded portion 7. The rear end 8 of the shank has also been represented.

Radially outwardly of the shaft 5 and defining an annular passage 10 therewith is a blocking ring 9 whose outer periphery is guided slidably on the inner wall of the bore 1. At its left-hand end, the blocking ring 9 is formed with outwardly extending notches 19 communicating with the passage 10 and with an annular gap 10' forming an extension of this passage in the closed position of the valves. In the above position of the valve, the passage from the annular gap 10 to the region ahead of the injection molding worm includes the notches 19.

A pressure ring 11 is threaded at 6 to the shank and has an annular surface lying in a plane perpendicular to the axis of the valves, which abuts the annular end 20 of the worm 2 and is flush with the latter at the inner and outer edges of this surface.

The abutment surface 20 serves an axial bore 12 in the worm 2 which threadedly receives the portion 7 of the shank and a removable and replaceable solid shim 13. The latter has a surface 13' which forms the floor of the bore 12 and against which the surface 8 abuts. The shim 13 also abuts the wall 14.

The blocking ring 9 has two abutment surfaces 15 and 16 which engage surfaces 17 and 18 of the head 3 and the pressure ring 11, respectively.

As pressure is built up by the worm, the synthetic resin material presses the blocking ring 9 to the left until the surface 15 abuts the surface 17 and synthetic resin material is forced through passages 10, 19 into the space ahead of the worm, i.e. to the left of the body 4.

When the worm is now axially shifted to the left to drive the molten material into the mold, the pressure upon the blocking ring 9 is shifted relative to the head to the right so that surfaces 16 and 18 come together and seal the region upstream of these abutting surfaces from the region downstream thereof.

The forces thus applied to the pressure ring 11 by the blocking ring are transferred directly to the worm as are the pressures applied to the head without requiring transfer through the screw threads. These forces, of course, are transferred without involving the pressure ring either.

Note that the lip 11' overhanging the smooth shaft provides lateral support if required at the portion of the pressure ring most remote from its abutment with the worm.

We claim:

1. In an injection molding machine in combination:
an injection cylinder;
a plastifying worm rotatably and axially shiftable in said cylinder to generate a liquid synthetic resin and displaces the same in said cylinder in a direction of a downstream end of said worm; and
a backflow preventer mounted on said end of said worm, said backflow preventer comprising:
a head converging in said direction and having a shank extending from said head in the opposite direction, said worm having an axial bore, said shank being threaded into said bore and bottomed on a floor thereof,
a pressure ring surrounding said shank and abutting said end of said worm around said shank with a surface of said pressure ring turned away from said head,
a blocking ring surrounding said shank and axially shiftable between said head and said pressure ring while being guided on an inner wall of said cylinder, said rings having engaging surfaces adapted to abut upon the displacement of said worm to drive synthetic resin material from said cylinder,
means forming a passage between said blocking ring and said head and effective upon separation of said surfaces to permit synthetic resin material to flow from said worm to a part of said cylinder ahead of said head, a shim received in said axial bore and defining said floor, said shim bearing upon said worm within said bore, and a thread connection between said pressure ring and said shank.

2. The combination defined in claim 1 wherein said shim is replaceable by shims of other thickness to establish the stroke of said blocking ring relative to said head.

3. The combination defined in claim 1 wherein apart from its abutment with said worm, the only other abutment formed by said pressure ring is that of its said surface engaging said blocking ring.

4. The combination defined in claim 3 wherein said shank has a smooth large diameter portion, said pressure ring having a lip overhanging said smooth large diameter portion.

* * * * *